(No Model.)
H. L. BOYLE.
WHEEL HUB.
No. 533,341. Patented Jan. 29, 1895.
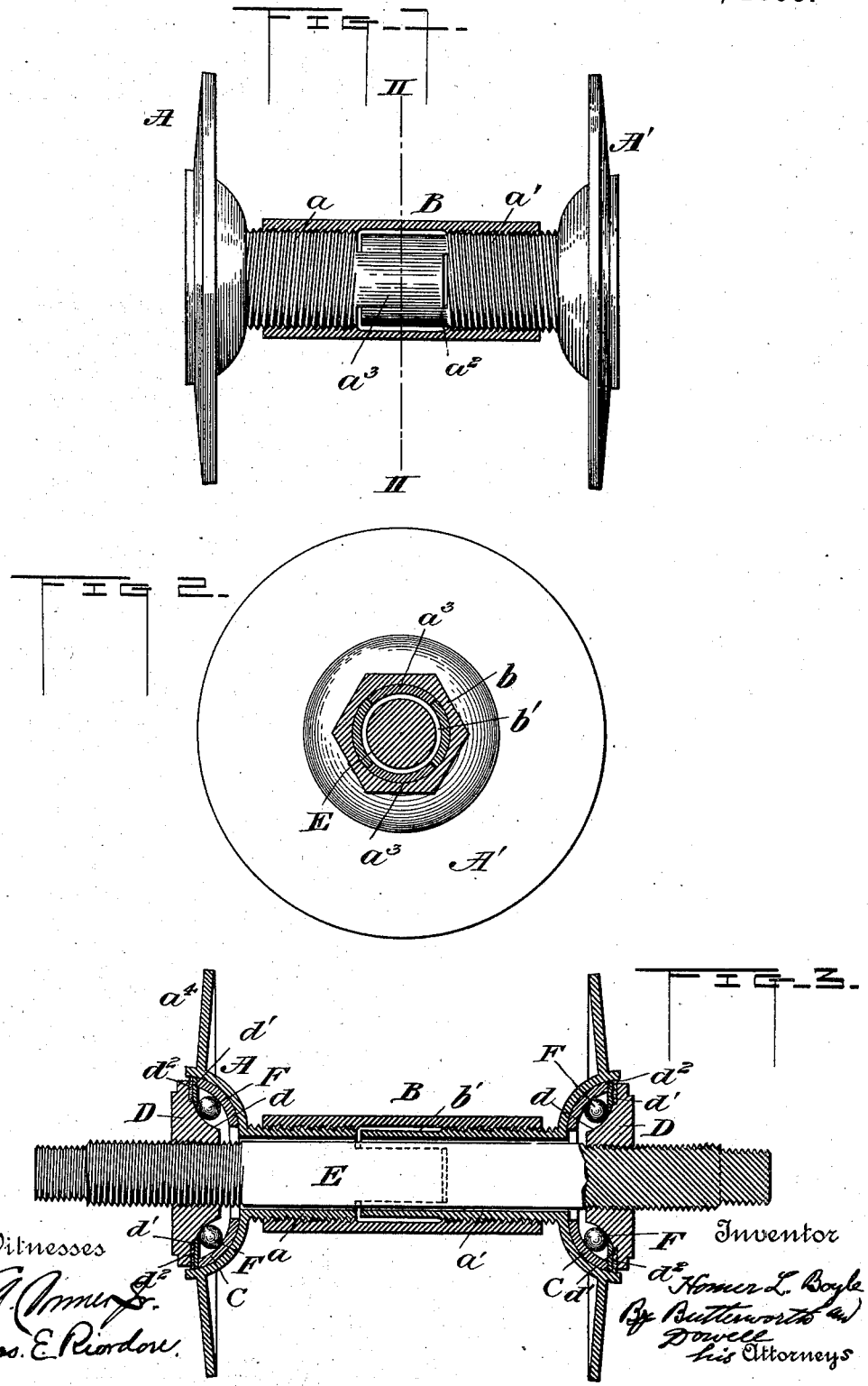

UNITED STATES PATENT OFFICE.

HOMER L. BOYLE, OF GRAND RAPIDS, MICHIGAN, ASSIGNOR OF THREE-FOURTHS TO DON J. LEATHERS AND LOUIS BARTH, OF SAME PLACE.

WHEEL-HUB.

SPECIFICATION forming part of Letters Patent No. 532,341, dated January 29, 1895.

Application filed April 17, 1894. Serial No. 507,879. (No model.)

*To all whom it may concern:*

Be it known that I, HOMER L. BOYLE, a citizen of the United States, residing at Grand Rapids, in the county of Kent and State of Michigan, have invented certain new and useful Improvements in Wheel-Hubs; and I do hereby declare the following to be a full, clear, and exact description of the invention, such as will enable others skilled in the art to which it appertains to make and use the same.

This invention relates to improvements in wheels for bicycles, tricycles, or other road vehicles, but more particularly to hubs or axle-boxes.

The objects of the invention are to provide an improved extensible axle-box or hub by which the spokes may be readily tightened to increase the tension, and also improved ball-bearings adapted to prevent friction in use; the several parts being simple in construction, efficient in use and inexpensive in manufacture.

To this end the invention consists in certain improved features of construction and combinations of parts, all as will be hereinafter described and particularly pointed out in the claims at the end of the description.

Referring to the accompanying drawings, which form a part of this specification, and in which similar letters of reference are used to denote similar parts of the device, Figure 1 represents a plan of the extensible hub, with an adjustable sleeve thereon shown in section. Fig. 2 is a cross-section taken on the line II—II of Fig. 1; and Fig. 3 is a longitudinal section taken through the hub, showing the axle-tree or spindle partly in section.

The hub may consist of two sections $A$, $A'$, each having an inwardly projecting, exteriorly screw-threaded, cylindrical portion $a$, upon which may be screwed an adjustable sleeve $B$; the screw-threads upon one section being made right-handed and those upon the other section left-handed and the sleeve correspondingly threaded, so that when the latter is turned either to the right or left the two parts of the hub will be caused to approach or recede from each other, according to the direction in which the sleeve is turned, thereby either extending or contracting the hub as may be desired. This sleeve is preferably made square or polygonal in cross-section, as indicated at $b$, in Fig. 2, for the attachment of a wrench or other suitable device by which the sleeve may be rotated to accomplish the aforesaid adjustment. The sleeve is also preferably recessed, interiorly, as at $b'$, centrally thereof, to form an annular oil chamber or reservoir surrounding the inner ends of the parts $a$, $a$, of the hub. One of the parts $a$, is provided with an elongated recess or recesses $a^2$, and the other with a correspondingly shaped tongue or tongues $a^3$, adapted to fit said recess or recesses so as to interlock therewith and prevent rotation of one part of the hub independently of the other.

The outer faces of the hub sections or plates $A$, $A'$, are concave in form, as shown, and within such concave portions are placed concavo-convex rings or bushings $C$, $C$, and set nuts $D$, $D$, screwed upon the axle-tree or spindle $E$, have their inner faces formed each with an annular concavity or recess $d$, opposed to the concave of the bushing $C$, so as to provide between such parts an annular recess of oval form in cross-section. Within such recesses are placed suitable balls $F$, $F$, and a metallic ring $d'$, and an outer ring $d^2$, of chamois skin or other soft material, are interposed between the bushing $C$, and the periphery of the nut $D$. By this means ball-bearings are provided and the balls and wearing surfaces are housed within the hub, so as to be thoroughly protected from dust, and any wear may be readily taken up at will by simply tightening the nuts $D$, $D$, and the spokes and felly may be kept taut by adjusting the sleeve $B$, while the working parts are kept lubricated by the lubricant contained in the annular chamber surrounding the interlocked ends of the hub sections.

The hub sections may have circular flanges $a^4$, $a^5$, respectively, which may be perforated or recessed as may be desired to receive the inner ends of the spokes of the wheel.

It will be understood, of course, that my invention is not restricted to the exact construction shown and described herein, as it is obvious that the ball-bearings may be applied to a hub without duplicate parts, and that either plate with its nut, bushing and interposed balls, will constitute the hub of a wheel confined on an axle-spindle of ordinary construction and having only one set of spokes; and while I preferably provide the cylindrical, exteriorly screw-threaded projections $a$, $a$, upon the convex faces of the end plates or hub sections A, A′, with interlocking tongue and groove or recess or equivalent connection, so as to prevent independent rotary movement, for some purposes such interlocking connection may be dispensed with. Furthermore, while I have shown an axle or spindle extending through the hub and provided with projecting screw-threaded ends upon which the nuts D, D, are screwed, other means may be employed for securing said parts together. For instance, the said nuts may be simply keyed upon the spindle and jam-nuts or other means may be employed for holding them in contact with the peripheries of the bushings and against the balls.

Having thus fully described my invention, what I claim as new, and desire to secure by Letters Patent of the United States, is—

1. An extensible hub comprising essentially a pair of end plates or hub sections each having on its inner side a cylindrical, exteriorly screw-threaded projection, and a sleeve screwed upon said projections; said sleeve and projections having right and left-handed screw-threads, and one of said projections being provided with a notch or recess and the other with a tongue adapted to engage said recess, so as to cause said parts to interlock and prevent independent rotary movement thereof, substantially as described.

2. In combination with the hub sections having the cylindrical, exteriorly screw-threaded interlocking projections, the rotatable sleeve screwed upon said projections and adapted when rotated to extend or contract the hub, substantially as described.

3. In combination with the dished plates having cylindrical, exteriorly screw-threaded interlocking projections on the convex faces thereof, and the sleeve screwed upon said projections, the bushings seated in the concave faces of said plates, the spindle having screw-threaded ends, the nuts screwed upon said spindle and having concave faces opposed to the concavities of said bushings, suitable washers interposed between the peripheries of said bushings and nuts, and balls placed in the oval annular spaces between the opposing concave faces of said nuts and bushings, substantially as described.

4. In combination with the two-part extensible hub having the cylindrical, exteriorly screw-threaded projections, the interiorly screw-threaded sleeve adjustably fitted upon said projections and provided with a centrally disposed recess between the sleeve and the threaded projections for forming an oil chamber, substantially as described.

5. In combination with the hub sections having the cylindrical, exteriorly screw-threaded interlocking projections, the interiorly screw-threaded sleeve adjustably fitted upon said projections and provided with an interior annular recess forming an oil chamber surrounding the interlocked ends of said projections, substantially as described.

In testimony whereof I affix my signature in presence of two witnesses.

HOMER L. BOYLE.

Witnesses:
J. A. E. CRISWELL,
CHAS. E. RIORDAN.